US006333864B1

(12) United States Patent
Nishimura et al.

(10) Patent No.: US 6,333,864 B1
(45) Date of Patent: Dec. 25, 2001

(54) POWER SUPPLY ADJUSTING CIRCUIT AND A SEMICONDUCTOR DEVICE USING THE SAME

(75) Inventors: Koichi Nishimura; Toshiya Uchida, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/639,092

(22) Filed: Aug. 16, 2000

(30) Foreign Application Priority Data

Dec. 27, 1999 (JP) ................................................ 11-371614

(51) Int. Cl.[7] ................................ H02M 3/24; G05F 3/16
(52) U.S. Cl. ............................. 363/78; 323/313; 327/537
(58) Field of Search .............................. 363/78; 323/313, 323/314, 316, 312, 907; 327/540, 541, 562, 538, 537, 536

(56) References Cited

U.S. PATENT DOCUMENTS 5,086,238 * 2/1992 Wantanabe et al. ................. 323/314
5,153,452 * 10/1992 Iwamura et al. ..................... 307/303
5,694,072 * 12/1997 Hsiao et al. ......................... 327/537
5,736,894 * 4/1998 Suwa .................................... 327/538
6,046,954 * 4/2000 Yoon et al. .......................... 365/226
6,097,180 * 8/2000 Tsukude et al. ..................... 323/313
6,177,816 * 6/2001 Nagata .................................. 327/77

* cited by examiner

*Primary Examiner*—Rajnikant B Patel
(74) *Attorney, Agent, or Firm*—Arent Fox Kintner Plotkin & Kahn, PLLC

(57) ABSTRACT

A power supply adjusting circuit includes a reference voltage supplying part generating a reference voltage based on an external voltage, a plurality of internal voltage generating parts generating a plurality of respective internal voltages based on the reference voltage, and a plurality of control parts corresponding to the internal voltage generating parts, respectively, so as to be able to separately control the internal voltages.

11 Claims, 10 Drawing Sheets

POWER SUPPLY ADJUSTING CIRCUIT AND A SEMICONDUCTOR DEVICE USING THE SAME

BACKGROUND OF THE INVENTION

1. Field of the Invention

The present invention generally relates to power supply adjusting circuits and semiconductor devices using these circuits, and more particularly to a power supply adjusting circuit and a semiconductor device using a power supply adjusting circuit generating a plurality of internal power supplies based on an external power supply.

2. Description of the Related Art

In recent years, semiconductor devices such as Dynamic Random Access Memories (DRAMs) and the like have been manufactured with high density and high speed. In order to support this trend, parts used therein such as transistors, diodes, resistances, condensers and so on are required to be scaled down and operating voltages applied thereon are required to be lower.

For example, a DRAM semiconductor device causes a power supply adjusting circuit thereof to generate an internal step-down voltage Vii (for example, Vii=2.5V) based on an external voltage VDD (for example, VDD=3.3V) and supplies the internal step-down voltage Vii to internal circuits therein. The internal step-down voltage Vii is, however, subject to deviation from a design voltage due to dispersion of element characteristics caused during the manufacturing of the semiconductor device. The power supply adjusting circuit usually corrects such deviation by adjusting fuse boxes thereof.

FIG. 1 is a diagram showing a configuration of a conventional power supply adjusting circuit.

As shown in this diagram, the conventional power supply adjusting circuit includes a plurality of fuse boxes 10, a test register 11, a switch circuit 12, an internal reference power supply circuit 13, an internal step-down power supply circuit 14, and an internal step-up or boosted voltage generating circuit 20 generating an internal step-up voltage VPP.

The internal step-up voltage generating circuit 20 further includes a reference voltage generating circuit 21, a voltage dividing circuit 22, a comparator 23, an internal step-up voltage control circuit 24, and a charge pump 25.

The fuse boxes 10 and the test register 11 are connected to the internal reference power supply circuit 13 via the switch circuit 12. The switch circuit 12 switches between being connected to the fuse boxes 10 in a normal mode and being connected to the test register 11 in a test mode. The switch circuit 12 receives setting signals “a” from the fuse boxes 10 in the normal mode or setting signals “b” from the test register 11 in the test mode, and sends them to the internal reference power supply circuit 13.

According to the setting signals “a” or “b”, the internal reference power supply circuit 13 generates an internal reference voltage Vrf from an external voltage VDD and supplies the internal reference voltage Vrf to the internal step-down power supply circuit 14.

According to the internal reference voltage Vrf, the internal step-down power supply circuit 14 generates an internal step-down voltage Vii, which is adjusted by adjusting the internal reference voltage Vrf.

First, the internal step-down voltage Vii is adjusted in the test mode such that the setting signals “b” are supplied to the internal reference power supply circuit 13 from the test register 11 and are adjusted by adjusting a setting of the test register 11 until the internal step-down voltage Vii reaches an optimum value. At this time, if the fuse boxes 10 are adjusted so as to correspond to the setting of the test register 11, the internal step-down voltage Vii can be adjusted to reach an optimum value in the normal mode. As a result, the internal step-down voltage Vii is thus adjusted to reach its optimum value.

In general, a semiconductor device generates other internal voltages besides the above-mentioned internal step-down voltage Vii. For example, the internal step-up voltage generating circuit 20 receives the internal reference voltage Vrf and generates the internal step-up voltage VPP.

Specifically, when receiving the internal reference voltage Vrf, the reference voltage generating circuit 21 generates an internal reference voltage Vpref1 and supplies it to the comparator 23. The comparator 23 compares the internal reference voltage Vpref1 to a divided voltage VPP' obtained by dividing the internal step-up voltage VPP in the voltage dividing circuit 22 so as to send a comparison result VPPSZ to the internal step-up voltage control circuit 24. The VPP control circuit 24 controls the charge pump 25 according to the comparison result VPPSZ so as to make the internal step-up voltage VPP reach its optimum value.

In addition, configurations of the voltage dividing circuit 22 and the comparator 23 can be understood from FIG. 2.

The conventional power supply adjusting circuit generates, however, the internal step-down voltage Vii and the internal step-up voltage VPP based on the one internal reference voltage Vrf. In other words, since the internal step-down voltage Vii and the internal step-up voltage VPP are varied according to the internal reference voltage Vrf, a problem occurs in that relative adjustment between the internal step-down voltage Vii and the internal step-up voltage VPP cannot be made.

For example, in the case of correcting the voltage deviation caused by the dispersion of the element characteristics in the semiconductor device manufacturing, it is impossible for the internal step-down voltage Vii and the internal step-up voltage VPP to be adjusted independently.

SUMMARY OF THE INVENTION

It is a general object of the present invention to provide a power supply adjusting circuit and a semiconductor device including the same, in which the above problem can be eliminated.

Another and a more specific object of the present invention is to provide a power supply adjusting circuit and a semiconductor device including such a power supply adjusting circuit, which is capable of separately adjusting and optimizing a plurality of internal power supplies generated from an external power supply.

The above objects and other objects of the present invention are achieved by a power supply adjusting circuit comprising a reference voltage supplying part generating a reference voltage based on an external voltage, a plurality of internal voltage generating parts generating a plurality of respective internal voltages based on the reference voltage, and a plurality of control parts corresponding to the internal voltage generating parts, respectively, so as to be able to separately control the internal voltages.

The above objects and other objects of the present invention are achieved by a power supply adjusting circuit comprising a first internal voltage generating part generating a first internal voltage based on an external voltage, a second internal voltage generating part generating a second internal voltage based on the first internal voltage, a third internal voltage generating part generating a third internal voltage based on the first internal voltage, a first control part controlling the first internal voltage, and a second control part controlling the third internal voltage.

The above objects and other objects of the present invention are achieved by a semiconductor device comprising a power supply adjusting circuit, the power supply adjusting circuit including a reference voltage supplying part generating a reference voltage based on an external voltage, a plurality of internal voltage generating parts generating a plurality of respective internal voltages based on the reference voltage, and a plurality of control parts corresponding to the internal voltage generating parts, respectively, so as to be able to separately control the internal voltages, wherein at least one of the internal voltage generating parts generates an internal step-up power supply voltage.

Other objects, features and advantages of the present invention will become more apparent from the following detailed description when read in conjunction with the accompanying drawings.

DETAILED DESCRIPTION OF THE PREFERRED EMBODIMENT

With reference to the drawings, a description will be given of a preferred embodiment of the present invention.

Figure 1:
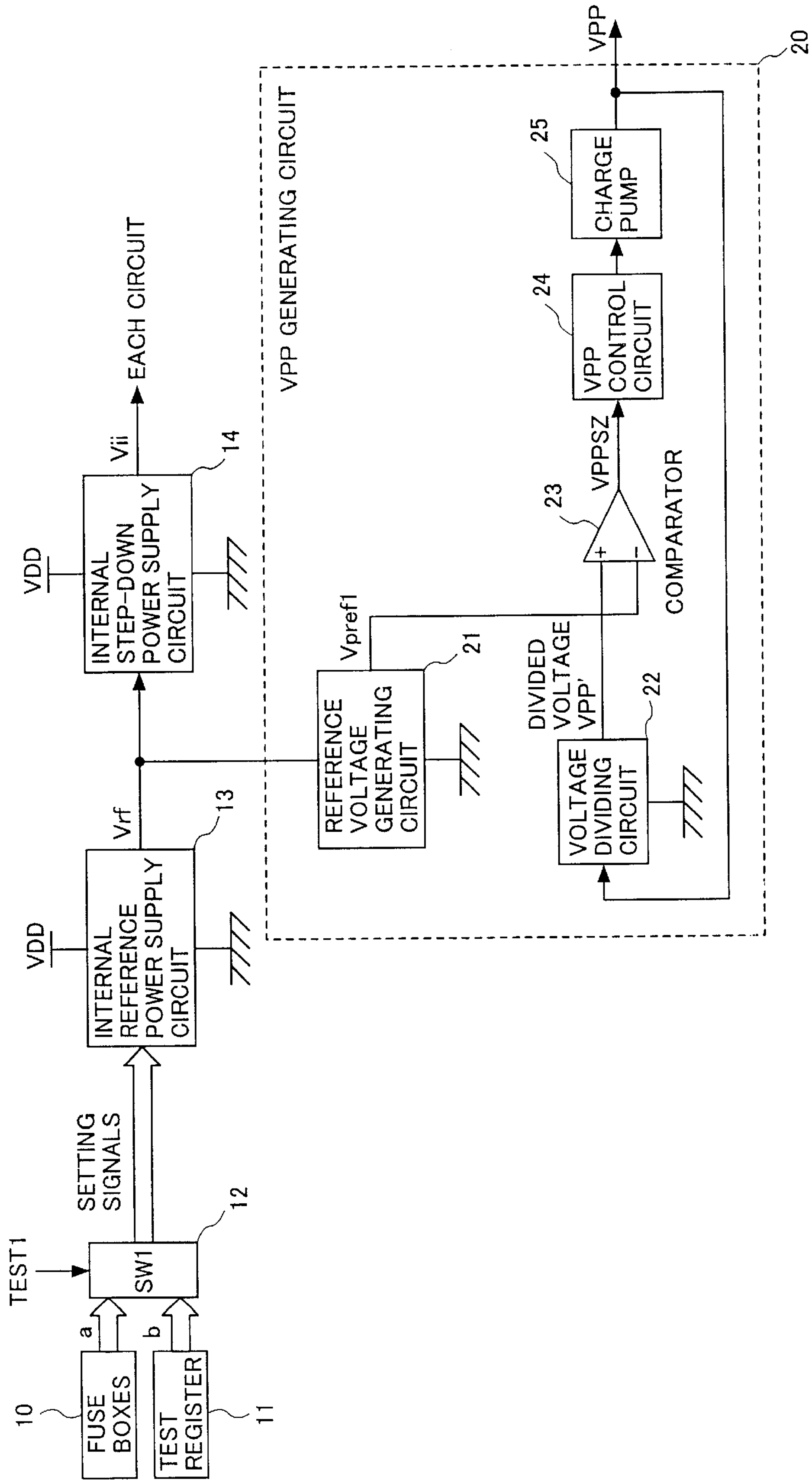
FIG.1 PRIOR ART
FIG. 1 is a diagram showing a configuration of a conventional power supply adjusting circuit.
Figure 2:
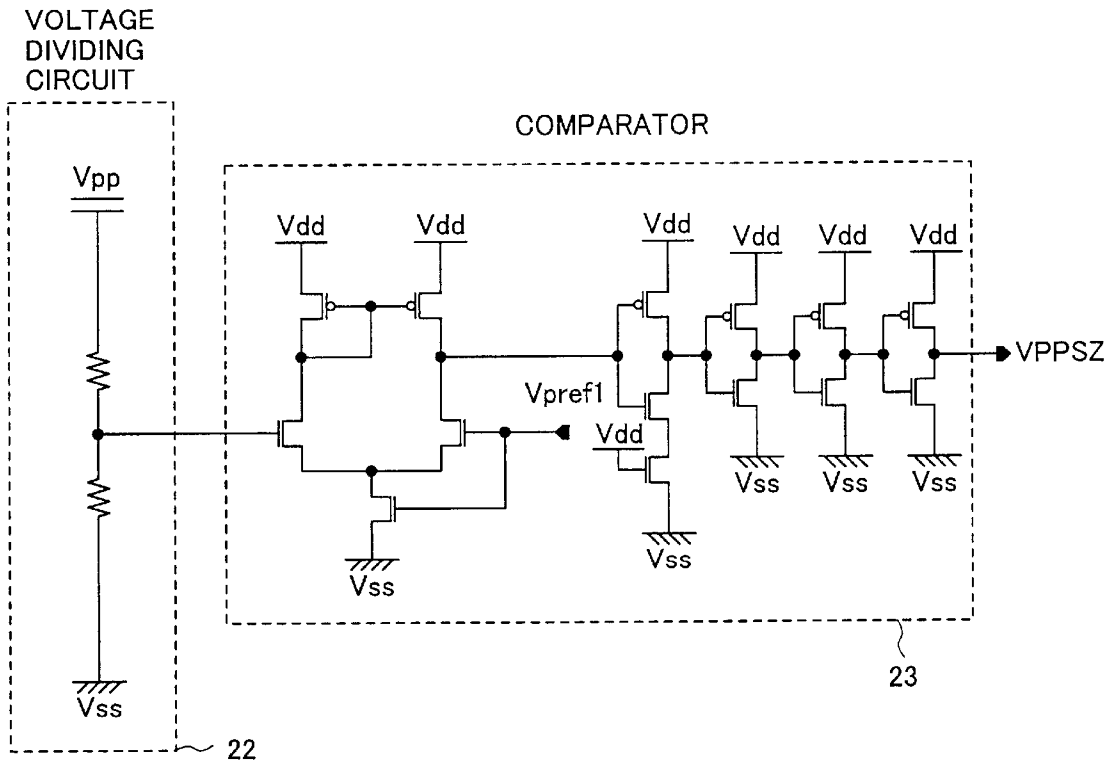
FIG.2 PRIOR ART
FIG. 2 is a diagram showing a voltage dividing circuit and a comparator of the conventional power supply adjusting circuit.
Figure 3:
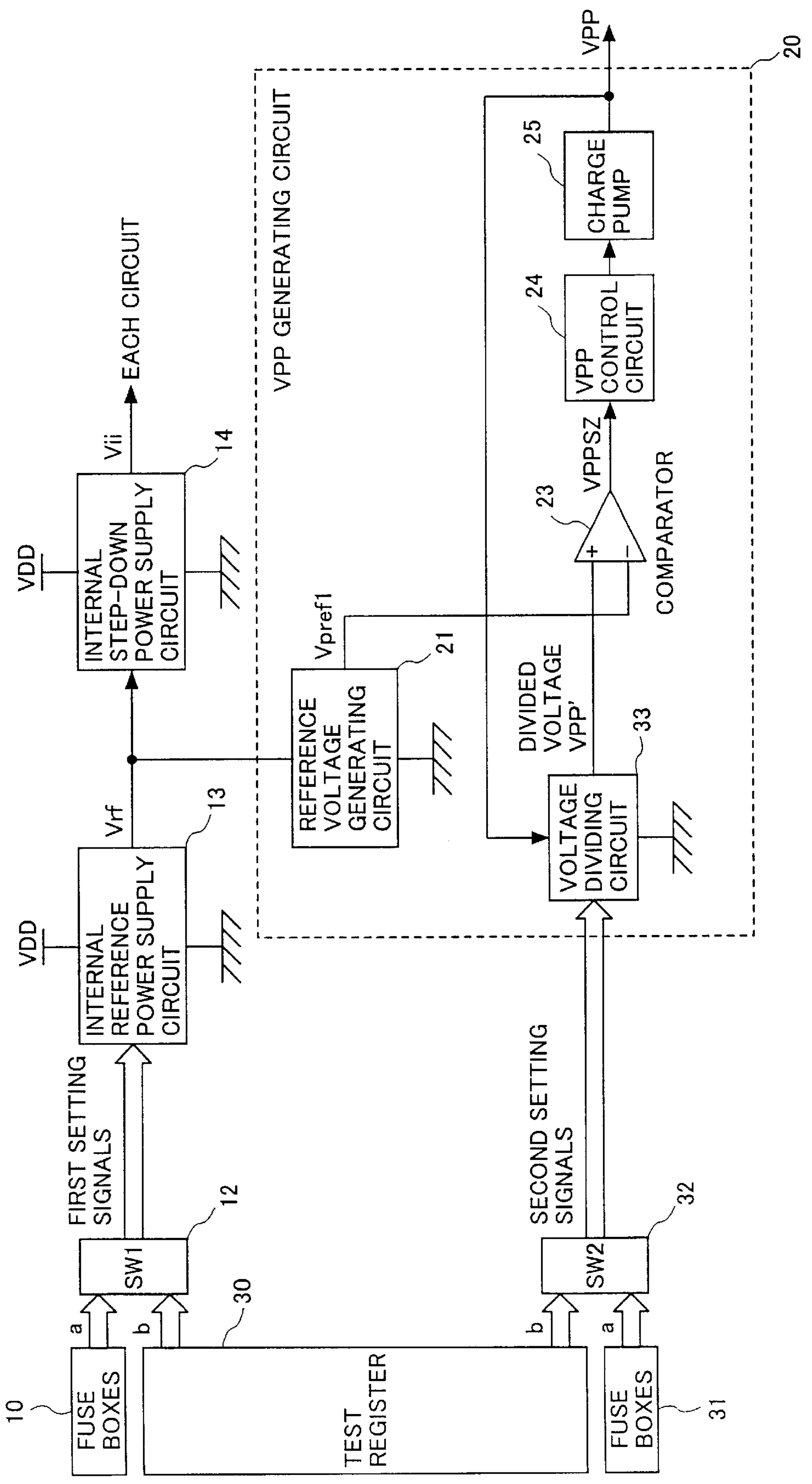
FIG. 3 is a diagram showing a configuration of a power supply adjusting circuit according to a first embodiment of the present invention.

FIG. 3 is a diagram showing a configuration of a power supply adjusting circuit according to a first embodiment of the present invention. In this diagram, parts and signals the same as those shown in FIG. 1 are given the same reference numerals.

Unlike the conventional power supply adjusting circuit, the power supply adjusting circuit of the first embodiment employs a test register 30 and a voltage dividing circuit 33 instead of the test register 11 and the voltage dividing circuit 22 and further includes a plurality of fuse boxes 31 and a switch circuit 32.

As shown in FIG. 3, the fuse boxes 10 and the test register 30 are connected to the switch circuit 12, and the fuse boxes 31 and the test register 30 are connected to the switch circuit 32. The switch circuit 12 switches between being connected to the fuse boxes 10 in a normal mode and being connected to the test register 30 in a test mode. The switch circuit 12 receives setting signals "a" from the fuse boxes 10 in the normal mode or setting signals "b" from the test register 30 in the test mode and sends them as first setting signals to the internal reference power supply circuit 13.

According to the first setting signals, the internal reference power supply circuit 13 generates the internal reference voltage Vrf from the external voltage VDD. The internal reference voltage Vrf is sent to both the internal step-down power supply circuit 14 and the reference voltage generating circuit 21.

Thus, since the internal step-down power supply circuit 14 generates the internal step-down voltage Vii based on the internal reference voltage Vrf, the internal step-down voltage Vii is adjusted by adjusting the internal reference voltage Vrf.

Figure 4:
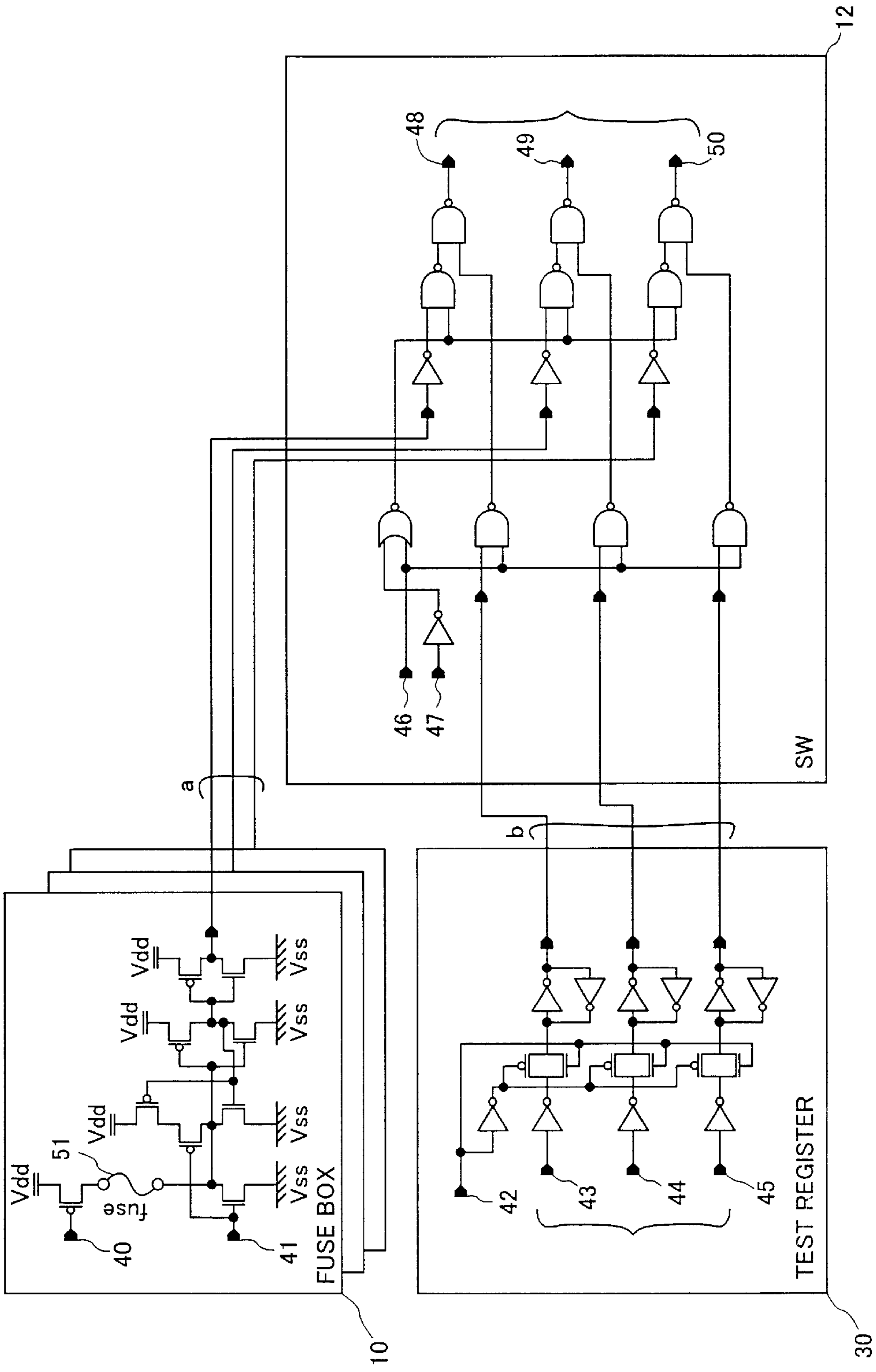
FIG. 4 is a diagram showing fuse boxes, a test register and a switch circuit of the power supply adjusting circuit according to the first embodiment.

FIG. 4 is a diagram showing configurations of the fuse boxes 10 (only one is shown in the diagram), the test register 30 and the switch circuit 12. As can be understood from FIG. 4, by inputting a test signal from a terminal 46, a switch between the normal mode and the test mode can be carried out.

For example, in the case of the normal mode, the first setting signals are outputted from the fuse boxes 10 and sent to the internal reference power supply circuit 13 via the switch circuit 12. In the case of the test mode, the first setting signals are outputted from the test register 30 and sent to the internal reference power supply circuit 13 via the switch circuit 12.

Thus, in the test mode, the first setting signals can be changed by adjusting the signals "b" supplied to terminals 43 through 45, whereas in the normal mode, the first setting signals can be changed by adjusting fuses 51 included in the fuse boxes 10.

In addition, the number of the signals "a" from the fuse boxes 10 is equal to that of the signals "b" from the test register 30, and therefore it is possible to adjust the fuse boxes 10 so as to correspond to the setting of the test register 30.

Specifically, in the test mode, the first setting signals are changed by adjusting the signals sent to the terminals 43 through 45 of the test register 30, and thereby the internal step-down voltage Vii is set to reach its optimum value. If the fuse boxes 10 are adjusted to correspond to the signals sent to the terminals 43 through 45 at this time, then, in the normal mode, the internal reference voltage Vrf is adjusted to reach its optimum value. As a result, the internal step-down voltage Vii is optimized.

Referring back to FIG. 3, the internal reference power supply circuit 13 also sends the internal reference voltage Vrf to the reference voltage generating circuit 21 included in the internal step-up voltage generating circuit 20. The reference voltage generating circuit 21 generates the internal reference voltage Vpref1 based on the internal reference voltage Vrf.

Figure 5:
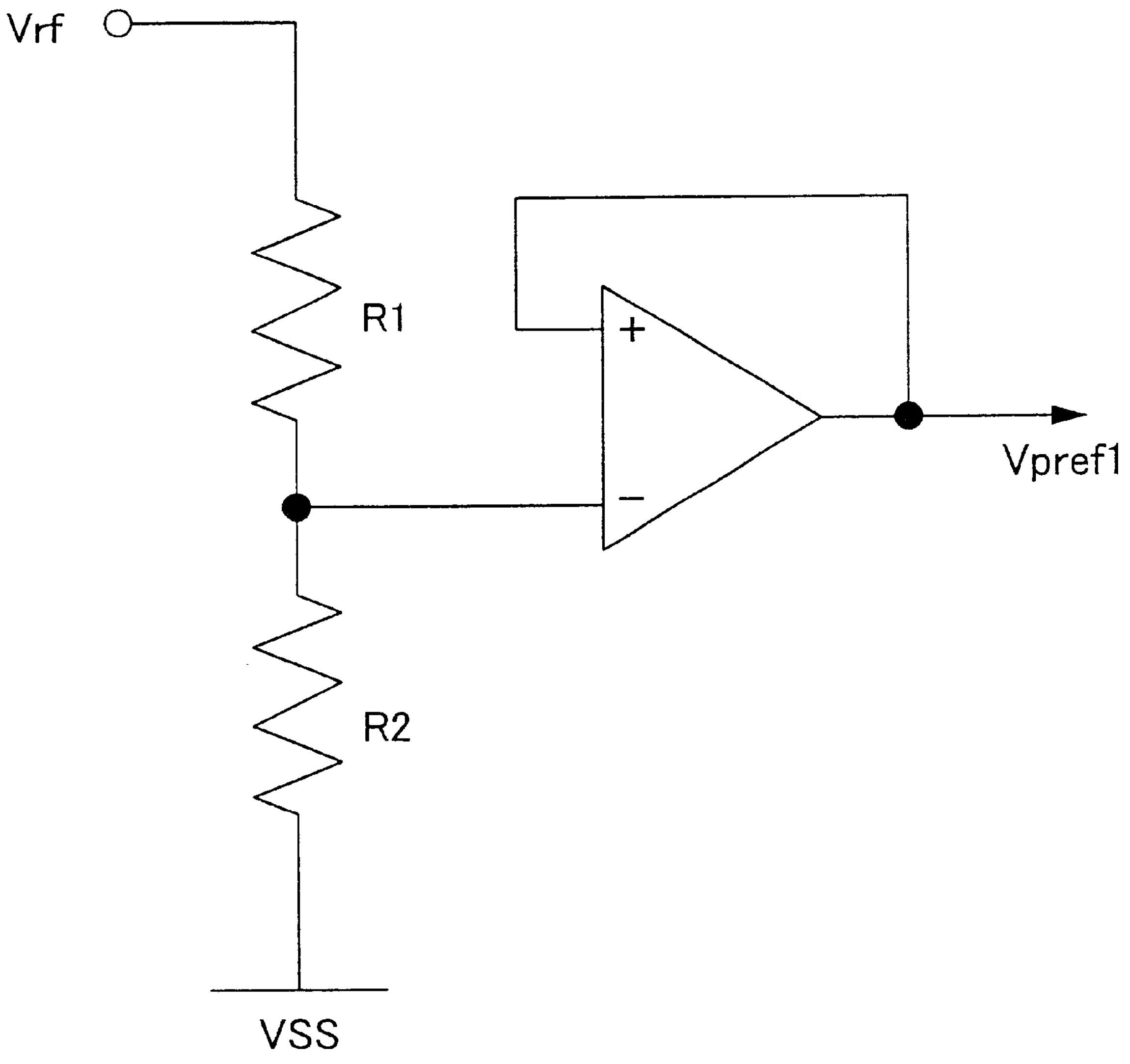
FIG. 5 is a diagram showing a reference voltage generating circuit of the power supply adjusting circuit according to the first embodiment.

FIG. 5 is a diagram showing a configuration of the reference voltage generating circuit 21. As shown in this diagram, the reference voltage generating circuit 21 may be configured to have two resistances R1 and R2 serving to divide the internal reference voltage Vrf and an operational amplifier serving to amplify the divided voltage so as to generate the internal reference voltage Vprefl.

Referring back to FIG. 3, the comparator 23 compares the internal reference voltage Vpref1 to the voltage VPP' obtained by dividing the internal step-up voltage VPP at the voltage dividing circuit 33 so as to output the comparison result VPPSZ. According to the comparison result VPPSZ, the internal step-up voltage control circuit 24 controls the charge pump 25 so that the internal step-up voltage VPP reaches its optimum value. For example, if the divided voltage VPP' is detected by the comparator 23 to be lower than the internal reference voltage Vpref1, then the charge pump 25 raises the internal step-up voltage VPP to be outputted.

The charge pump 25 performs feedback of sending the internal step-up voltage VPP to the voltage dividing circuit 33 as well as supplying the internal step-up voltage VPP to other circuits therein. The voltage dividing circuit 33 generates the voltage VPP' by dividing the internal step-up voltage VPP and sends it to the comparator 23.

The power supply adjusting circuit of the first embodiment features a voltage in the voltage dividing circuit 33 being proportionally adjusted by using second setting signals.

Similar to the switch circuit 12, the switch circuit 32 switches between being connected to the fuse boxes 31 in a normal mode and being connected to the test register 30 in a test mode. The switch circuit 32 receives setting signals "a" from the fuse boxes 31 in the normal mode or setting signals "b" from the test register 30 in the test mode and sends them as the second setting signals to the voltage dividing circuit 33.

The fuse boxes 31, the test register 30, and the switch circuit 32 have the same configurations as those of FIG. 4.

The switch circuit 32 is connected between the fuse boxes 31 and the voltage dividing circuit 33 in the normal mode or between the test register 30 and the voltage dividing circuit 33 in the test mode. Accordingly, the voltage dividing proportion of the voltage dividing circuit 33 is adjusted at first by sending the second setting signals from the test register 30 to the voltage dividing circuit 33.

By adjusting the setting of the test register 30, the second setting signals are adjusted and the internal step-up voltage VPP is set to its optimum value. If the fuse boxes 31 are adjusted so as to correspond to the setting of the test register 30 at this time, then the voltage VPPSZ outputted from the comparator 23 is adjusted to reach its optimum value. As a result, the internal step-up voltage VPP is optimized.

Figure 6:
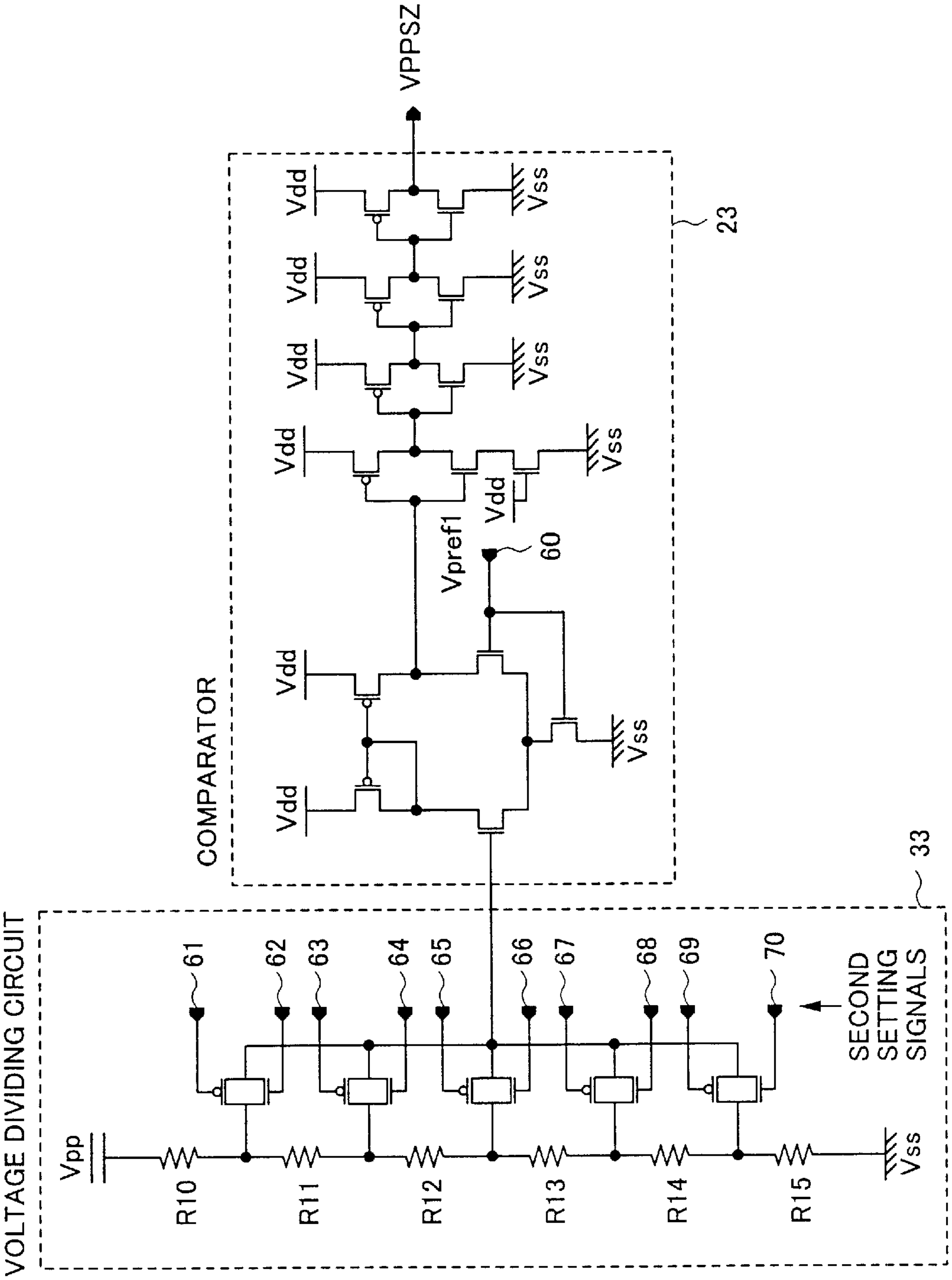
FIG. 6 is a diagram showing a voltage dividing circuit and a comparator of the power supply adjusting circuit according to the first embodiment.

FIG. 6 is a diagram showing the voltage dividing circuit 33 and the comparator 23. As shown in this diagram, the voltage dividing circuit 33 includes a plurality of high-valued resistors R10 through R15 arranged in series between the internal step-up voltage VPP and the ground. According to the second setting signals supplied via the switch circuit 32, the internal step-up voltage VPP is divided. The second setting signals are supplied to terminals 61 through 70, and by controlling transfer gates corresponding to these terminals 61 through 70, a voltage between any two resistors of the resistors R10 through R15 is outputted as the divided voltage VPP'.

Accordingly, the voltage dividing circuit 33 adjusts the voltage dividing proportion thereof by means of the second setting signals, and thereby the divided voltage VPP' can be generated by dividing the internal step-up voltage VPP and supplied to the comparator 23.

The comparator 23 compares the internal reference voltage Vpref1 supplied from the terminal 60 to the voltage VPP' supplied from the voltage dividing circuit 33 so as to output the comparison result VPPSZ.

As a result, according to the comparison result VPPSZ, the internal step-up voltage control circuit 24 controls the charge pump 25 to adjust the internal step-up voltage VPP.

Figure 7:
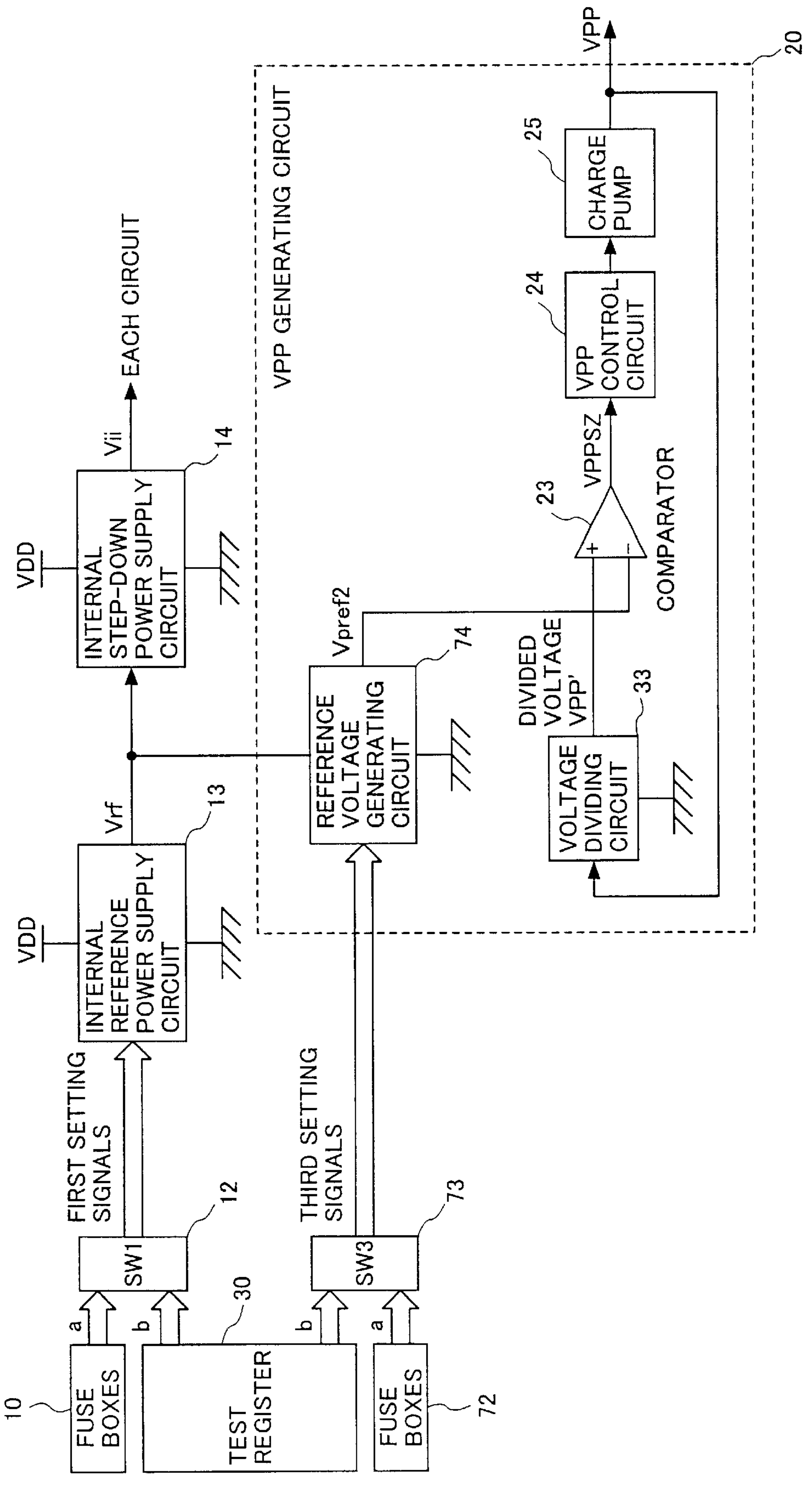
FIG. 7 is a diagram showing a configuration of a power supply adjusting circuit according to a second embodiment of the present invention.

Next, a description will be given of a power supply adjusting circuit according to a second embodiment of the present invention, by referring to FIG. 7. As shown in FIG. 7, parts the same as those of FIG. 3 are given the same reference numerals and a description thereof is omitted.

The power supply adjusting circuit of the second embodiment features a reference voltage generating circuit 74, instead of the reference voltage generating circuit 21 in the first embodiment, generating an internal reference voltage Vpref2, and the internal reference voltage Vpref2 being adjusted by using third setting signals.

The reference voltage generating circuit 74 is connected to both the test register 30 and a plurality of fuse boxes 72 via a switch circuit 73.

Similar to the switch circuit 32, the switch circuit 73 switches between being connected to the fuse boxes 72 in the normal mode and being connected to the test register 30 in the test mode. The switch circuit 73 receives the setting signals "a" from the fuse boxes 72 in the normal mode or the setting signals "b" from the test register 30 in the test mode and sends them as the third setting signals to the reference voltage generating circuit 74.

In addition, the fuse boxes 72, the test register 30 and the switch circuit 73 have the same configurations as those of FIG. 4.

The internal reference voltage Vpref2 is at first adjusted in the test mode by sending the third setting signals from the test register 30 to the reference voltage generating circuit 74. By adjusting the setting of the test register 30, the third setting signals are adjusted and the internal step-up voltage VPP can reach its optimum value. If the fuses boxes 72 are adjusted so as to correspond to the setting of the test register 30 performed at this time, the voltage VPPSZ outputted from the comparator 23 is adjusted to reach its optimum value in the normal mode. As a result, the internal step-up voltage VPP can be optimized.

Figure 8:
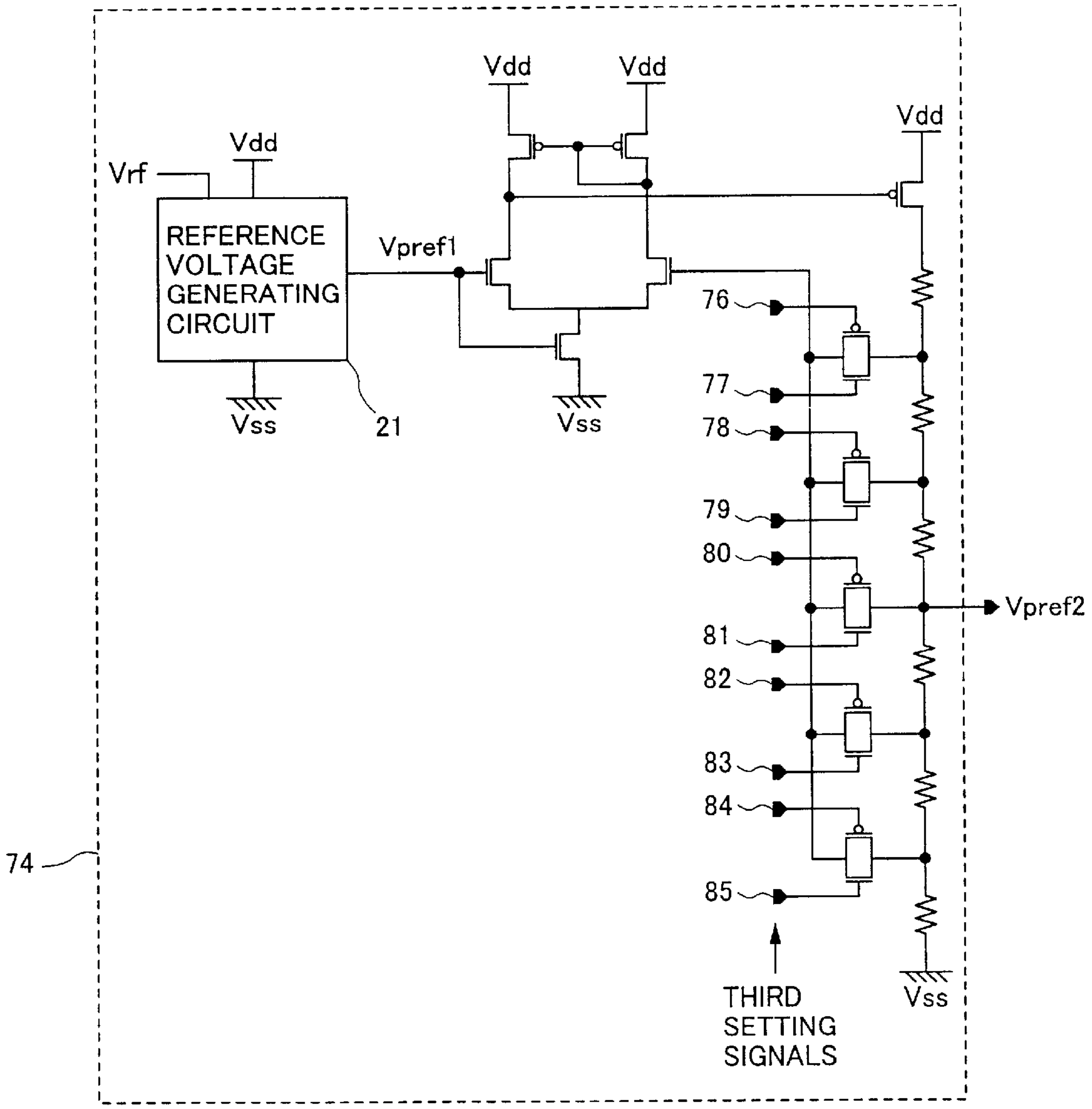
FIG. 8 is a diagram showing a reference voltage generating circuit of the power supply adjusting circuit according to the second embodiment.

FIG. 8 is a diagram showing the reference voltage generating circuit 74. As shown in this diagram, the reference voltage generating circuit 74 includes the reference voltage generating circuit 21 and a plurality of terminals 76 through 85, wherein the internal reference voltage Vpref1 generated by the reference voltage generating circuit 21 is adjusted into the internal reference voltage Vpref2 according to the third setting signals supplied via the switch circuit 73.

Specifically, the internal reference voltage Vrf is supplied to the reference voltage generating circuit 21, where the internal reference voltage Vpref1 is generated. The third setting signals are supplied to the terminals 76 through 85, and by controlling transfer gates corresponding to these terminals 76 through 85, the internal reference voltage Vpref1 is adjusted into the internal reference voltage Vpref2.

Accordingly, it is possible in the second embodiment for the reference voltage generating circuit 74 to adjust the internal reference voltage Vpref1 generated from the internal reference voltage Vrf so as to generate the internal reference voltage Vpref2.

Next, a description will be given of a power supply adjusting circuit of a third embodiment of the present invention, by referring to FIG. 9. In this diagram, parts the same as those of FIG. 7 are given the same reference numerals and a description thereof is omitted.

Unlike the first and second embodiments, the power supply adjusting circuit of the third embodiment is configured to enable separate adjustment of the internal step-down voltage Vii and an internal step-down voltage Viic. For example, transistors in high-density memory cell circuits are required to be made smaller than peripheral circuits. In other words, the internal step-down voltage Viic for these memory cell circuits should be designed to be lower than the internal step-down voltage Vii.

Figure 9:
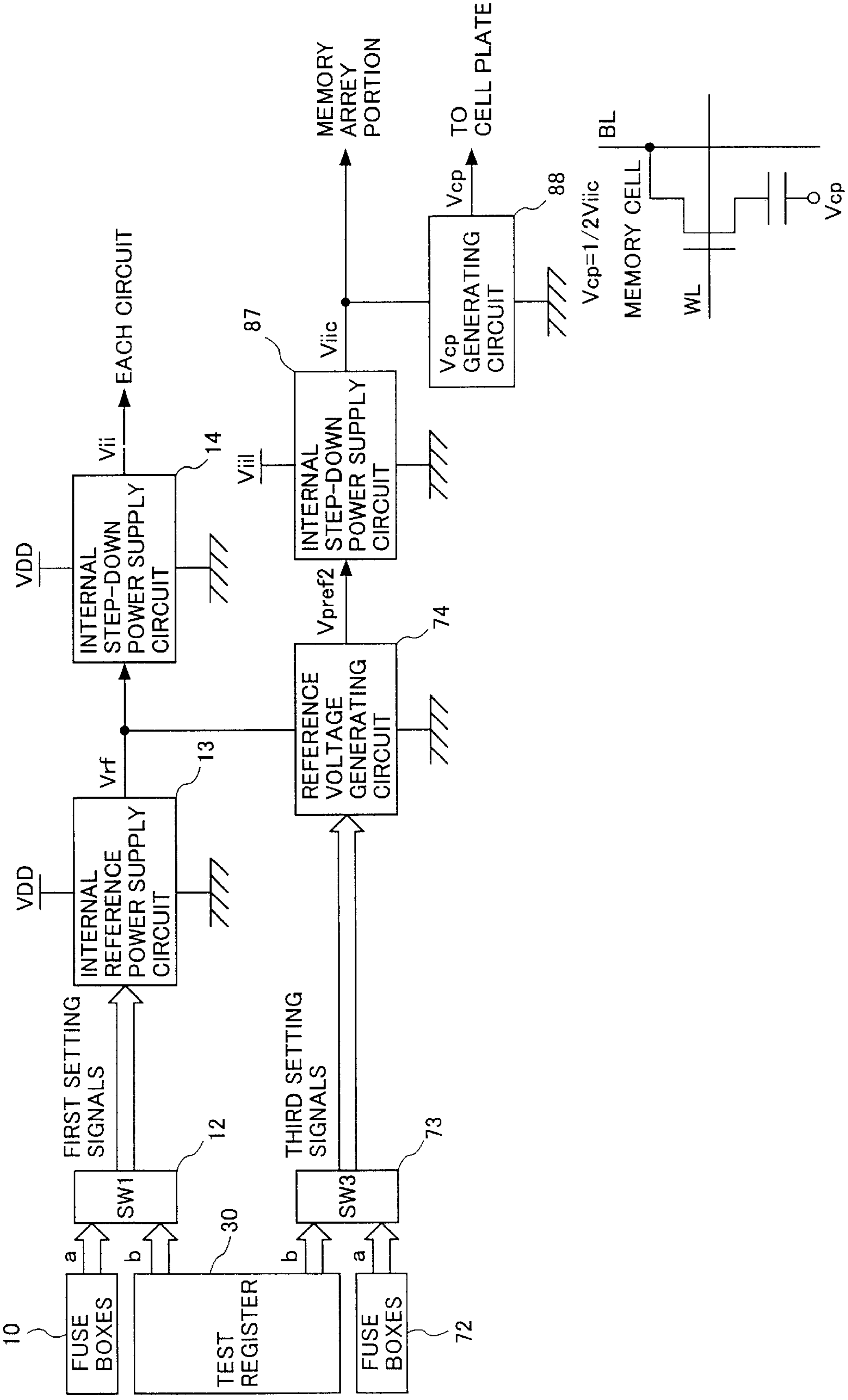
FIG. 9 is a diagram showing a configuration of a power supply adjusting circuit according to a third embodiment of the present invention.

As shown in FIG. 9, the reference voltage generating circuit 74 adjusts the internal reference voltage Vrf from the internal reference power supply circuit 13 by means of the third setting signals so as to generate the internal reference voltage Vpref2, in the same way as that described in the second embodiment.

The internal reference voltage Vpref2 is sent to an internal step-down power supply circuit 87 which divides it into the internal step-down voltage Viic by using resistors. The internal step-down voltage Viic is sent to both a memory array portion and a plate voltage generating circuit 88 generating a plate voltage Vcp for memory cells arranged on a cell plate. In addition, the plate voltage generating circuit 88 generates the plate voltage Vcp based on the internal step-down voltage Viic and supplies it to the cell plate.

Most memory devices such as DRAM and the like are configured such that the plate voltage Vcp for the memory cells arranged therein has a relationship Vcp=½ Viic. Accordingly, by generating the plate voltage Vcp from the internal step-down voltage Viic, even adjusting the internal step-down voltage Viic does not interfere with the relationship.

Figure 10:
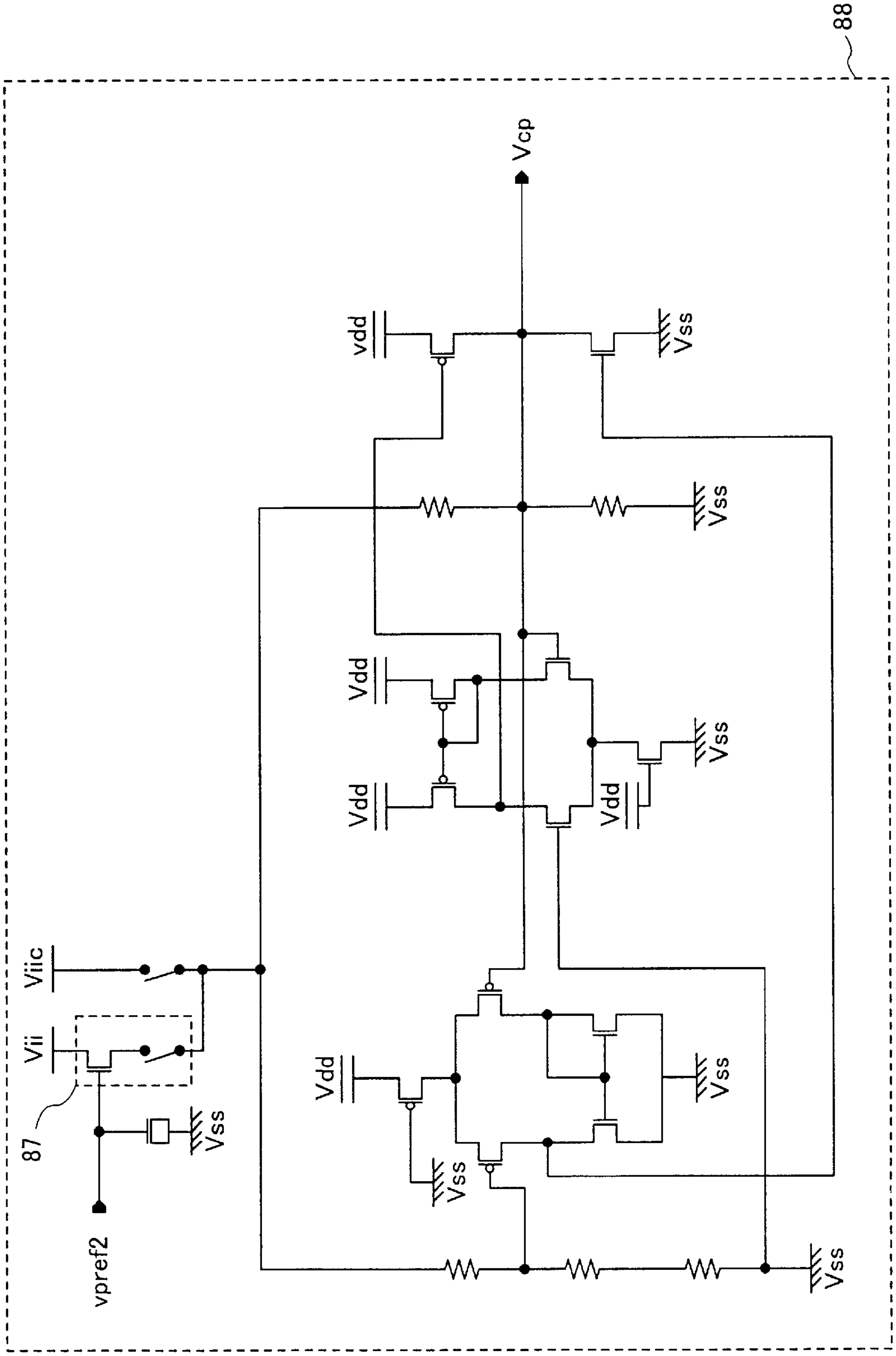
FIG. 10 is diagram showing a plate voltage generating circuit of the power supply adjusting circuit according to the third embodiment of the present invention.

FIG. 10 is a diagram showing such a plate voltage generating circuit 88. As shown in this diagram, the plate voltage generating circuit 88 receives the internal step-down voltage Viic and divides it by means of the resistor division so as to generate the plate voltage Vcp.

As previously described, according to the power supply adjusting circuits of the present invention, the internal reference voltage Vrf is generated based on the external voltage and further is divided into a plurality of internal voltages, which can be separately adjusted to reach respective design values. As a result, the previously described voltage deviation caused by the dispersion of the element characteristics during manufacturing can be easily corrected.

The above description is provided in order to enable any person skilled in the art to make and use the invention and sets forth the best mode contemplated by the inventor for carrying out the invention.

Although the present invention has been described in terms of various embodiments, it is not intended that the invention be limited to these embodiments. The present invention is applicable to any power supply adjusting circuit and semiconductor device using the same, in which internal voltages are formed based on an internal reference voltage. Modification within the spirit of the invention will be apparent to those skilled in the art.

The present application is based on Japanese priority application No. 11-371614 filed on Dec. 27, 1999, the entire contents of which are hereby incorporated by reference.

What is claimed is:

1. A power supply adjusting circuit comprising:

a reference voltage supplying part generating a reference voltage based on an external voltage;

a plurality of internal voltage generating parts generating a plurality of respective internal voltages based on said reference voltage, said plurality of respective internal voltages being separate from each other; and a plurality of control parts corresponding to said internal voltage generating parts, respectively, so as to be able to separately control said internal voltages.

2. The power supply adjusting circuit as claimed in claim 1, wherein:

said plurality of internal voltage generating parts includes a first internal voltage generating part generating a first internal voltage and a second internal voltage generating part generating a second internal voltage; and said plurality of control parts includes a first control part controlling said first internal voltage generating part and a second control part controlling said second internal voltage generating part.

3. The power supply adjusting circuit as claimed in claim 2, wherein said second internal voltage generating part includes:

a first comparison voltage generating unit generating a first comparison voltage according to a control signal supplied from said second control part;

a second comparison voltage generating unit generating a second comparison voltage based on said reference voltage; and an adjusting unit adjusting said second internal voltage according to a comparison result of said first comparison voltage and said second comparison voltage.

4. The power supply adjusting circuit as claimed in claim 2, wherein:

said first internal voltage generating part is an internal step-down voltage generating circuit; and said second internal voltage generating part is an internal step-up voltage generating circuit.

5. The power supply adjusting circuit as claimed in claim 3, wherein said first comparison voltage generating unit generates said first comparison voltage from said second internal voltage according to said control signal supplied from said second control part.

6. The power supply adjusting circuit as claimed in claim 2, wherein said second control part includes:

a first control signal generating unit generating a first control signal based on electrical signals supplied externally;

a second control signal generating unit generating a second control signal based on electrical signals supplied internally; and a switching unit switching between sending said first control signal generated by said first control signal generating unit in a test mode and sending said control signal generated by said second control signal generating unit in a normal mode, to said second internal voltage generating part.

7. The power supply adjusting circuit as claimed in claim 2, wherein said second internal voltage generating part includes:

a first comparison voltage generating unit generating a first comparison voltage based on said reference voltage according to a control signal supplied from said second control part;

a second comparison voltage generating unit generating a second comparison voltage based on said second internal voltage: and an adjusting unit adjusting said second internal voltage according to a comparison result of said first comparison voltage and said second comparison voltage.

8. A power supply adjusting circuit comprising:

a first internal voltage generating part generating a first internal voltage based on an external voltage;

a second internal voltage generating part generating a second internal voltage based on said first internal voltage;

a third internal voltage generating part generating a third internal voltage based on said first internal voltage;

a first control part controlling said first internal voltage; and a second control part controlling said third internal voltage, wherein said first internal voltage, said second internal voltage and said third internal voltage are separate from each other.

9. The power supply adjusting circuit as claimed in claim 8, further comprising:

a fourth internal voltage generating part generating a fourth internal voltage based on said third internal voltage; and a fifth internal voltage generating part generating a fifth internal voltage based on said fourth internal voltage.

10. The power supply adjusting circuit as claimed in claim 9, wherein said fifth internal voltage is in proportion to said fourth internal voltage.

11. A semiconductor device comprising a power supply adjusting circuit, said power supply adjusting circuit including:

a reference voltage supplying part generating a reference voltage based on an external voltage;

a plurality of internal voltage generating parts generating a plurality of respective internal voltages based on said reference voltage, said plurality of respective internal voltages being separate from each other; and a plurality of control parts corresponding to said internal voltage generating parts, respectively, so as to be able to separately control said internal voltages;

wherein at least one of said plurality of internal voltage generating parts generates an internal step-up power supply voltage.

* * * * *